US011929841B2

(12) United States Patent
Jungwirth et al.

(10) Patent No.: US 11,929,841 B2
(45) Date of Patent: Mar. 12, 2024

(54) VIDEOCONFERENCING TOOLS

(71) Applicant: Rolland & Hamann Innovations, LLC, Minneapolis, MN (US)

(72) Inventors: Matthew Edward Lewis Jungwirth, St Paul, MN (US); Scott James Pederson, Minneapolis, MN (US)

(73) Assignee: Rolland & Hamann Innovations, LLC, Minneapolis, MN (US)

( * ) Notice: Subject to any disclaimer, the term of this patent is extended or adjusted under 35 U.S.C. 154(b) by 212 days.

(21) Appl. No.: 17/212,255

(22) Filed: Mar. 25, 2021

(65) Prior Publication Data

US 2022/0311633 A1    Sep. 29, 2022

(51) Int. Cl.
*H04L 12/18* (2006.01)
*G06F 3/16* (2006.01)
*H04L 9/40* (2022.01)
*H04N 7/14* (2006.01)

(52) U.S. Cl.
CPC .......... *H04L 12/1822* (2013.01); *G06F 3/165* (2013.01); *H04L 12/1818* (2013.01); *H04L 63/101* (2013.01); *H04N 7/142* (2013.01)

(58) Field of Classification Search
CPC ...... H04L 12/1822; G06F 3/165; H04N 7/142

USPC ......................................................... 709/204
See application file for complete search history.

(56) References Cited

U.S. PATENT DOCUMENTS

| | | | |
|---|---|---|---|
| 2009/0089716 A1* | 4/2009 | Chen ..................... | G06Q 10/00 709/204 |
| 2017/0134821 A1* | 5/2017 | D'Amelio ........ | H04N 21/42203 |
| 2021/0409547 A1* | 12/2021 | Channapragada ....... | H04N 7/15 |

* cited by examiner

*Primary Examiner* — Sibte H Bukhari
(74) *Attorney, Agent, or Firm* — Brooks, Cameron & Huebsch, PLLC

(57) ABSTRACT

In some examples, a computing device can include a processor resource and a non-transitory memory resource storing machine-readable instructions stored thereon that, when executed, cause the processor resource to: activate a silent mode for the computing device when a videoconference is initiated, set a threshold volume and designated frequency range for the computing device, deactivate the silent mode for the computing device when a microphone associated with the computing device receives a sound that exceeds the threshold volume and is within the designated frequency range, send the received sound to other users of the videoconference, and activate the silent mode for the computing device when the computing device stops receiving the sound.

14 Claims, 6 Drawing Sheets

VIDEOCONFERENCING TOOLS

BACKGROUND

A computing device can allow a user to utilize computing device operations for work, education, gaming, multimedia, and/or other uses. Computing devices can be utilized in a non-portable setting, such as at a desktop, and/or be portable to allow a user to carry or otherwise bring the computing device with while in a mobile setting.

DETAILED DESCRIPTION

Figure 1:
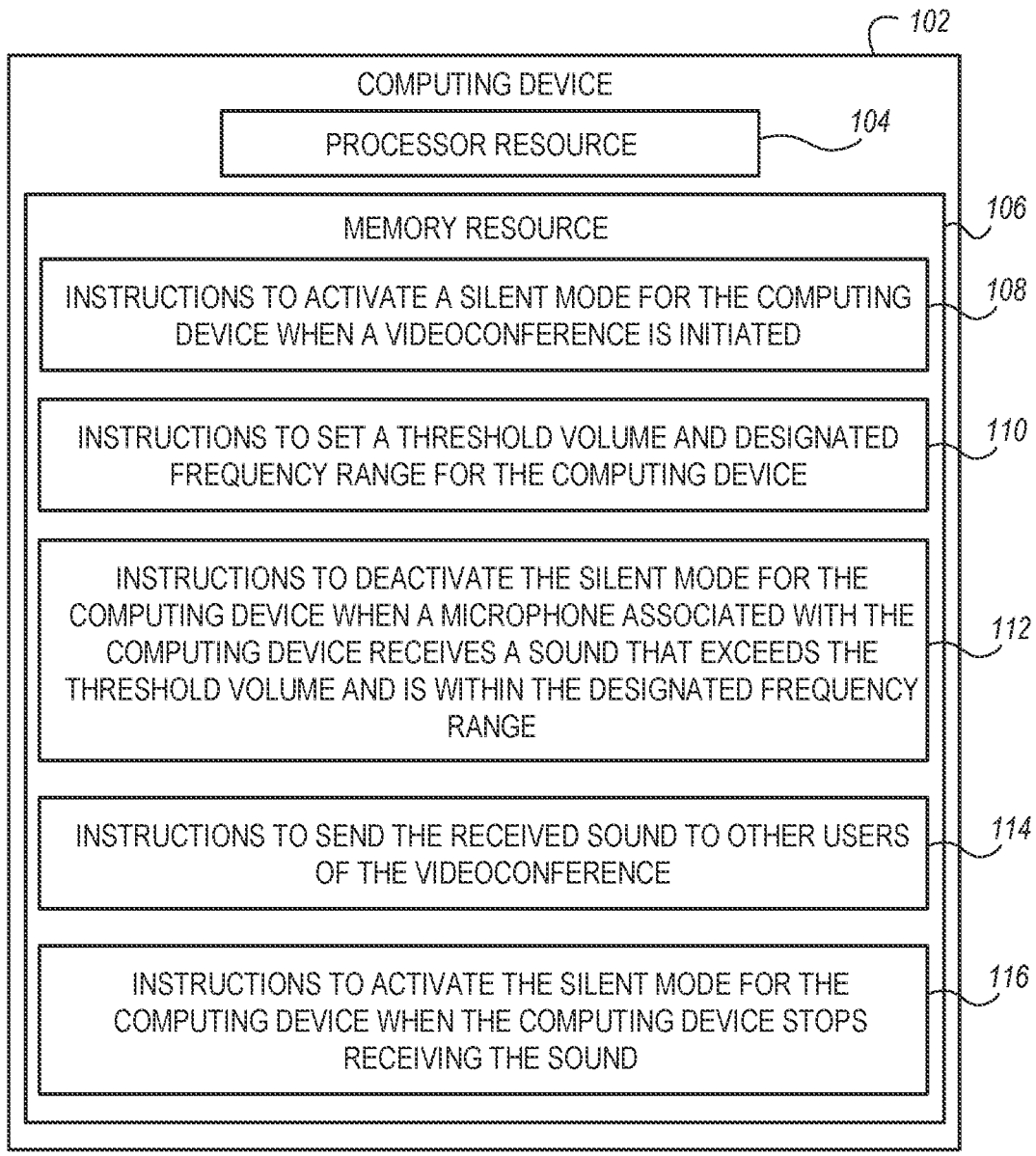
FIG. 1 illustrates an example of a computing device for videoconference communication.

A user may utilize a computing device for various purposes, such as for business and/or recreational use. As used herein, the term "computing device" refers to an electronic system having a processor resource and a memory resource. Examples of computing devices can include, for instance, a laptop computer, a notebook computer, a desktop computer, an all-in-one (AIO) computer, networking device (e.g., router, switch, etc.), and/or a mobile device (e.g., a smart phone, tablet, personal digital assistant, smart glasses, a wrist-worn device such as a smart watch, etc.), among other types of computing devices. As used herein, a mobile device refers to devices that are (or can be) carried and/or worn by a user.

In some examples, the computing device can be utilized to perform particular functions with peripheral devices, network devices, and/or client devices. For example, peripheral devices, network devices, and/or client devices can be communicatively coupled to the computing devices to perform corresponding functions. As used herein, a peripheral device can include a device that is utilized to execute functions of the computing device. For example, a peripheral device can include a camera, display, and/or microphone to allow a user of the computing device to perform a videoconference with a remote user utilizing a different computing device.

In previous systems, a videoconference with a plurality of users can be difficult when multiple groups of people within the plurality of users want to have a conversation. In addition, a speaker or presenter can be one of the plurality of users attempting to communicate a message to the other plurality of users. In these examples, the speaker or presenter can be distracted by users that may not be paying attention to the presentation and/or may not be capable of monitoring the other plurality of users while also performing the presentation. In addition, it can be difficult for a portion of the plurality of users to engage in a conversation that is related to the presenter but intended to be only for the portion of the plurality of users. Thus, the previous systems and methods may not include videoconference tools that allow for interactions that are similar to face-to-face meetings and/or in-person conference meetings. These limitations can prevent remote users from having similar experiences to in-person meetings.

The present disclosure relates to videoconference tools that aim to provide an end user experience that is more similar to in-person meetings. For example, the present disclosure relates to additional control functions be provided to a presenter during a particular videoconference. In this way, the presenter can focus on performing the presentation without having to worry or actively monitor attendees of the presentation. In some examples, the present disclosure can also allow a portion of a plurality of users to engage in a separate conversation while still being able to hear and/or see the presentation. In this way, a videoconference can be more similar to an in-person meeting, which can be more productive than a previous videoconference.

FIG. 1 illustrates an example of a computing device 102 for videoconference communication. In some examples, the computing device 102 can include a processor resource 104 communicatively coupled to a memory resource 106. As described further herein, the memory resource 106 can include instructions 108, 110, 112, 114, 116 that can be executed by the processor resource 104 to perform particular functions. In some examples, the computing device 102 can be associated with a peripheral device such as a display, camera, and/or microphone. For example, the computing device 102 can be utilized to execute instructions associated with functions of the peripheral devices to perform a videoconference. As used herein, a videoconference can include an audio and/or video exchange between computing devices.

In some examples, the computing device 102 can be communicatively coupled to the peripheral devices through a communication path. As used herein, a communication path refers to a connection that allows signals to be transferred between devices or within a particular device. In these examples, the signals can be utilized to provide communication between different devices and/or components within a device. For example, the computing device 102 can utilize the communication path to perform a videoconference with a remote computing device.

The computing device 102 can include components such as a processor resource 104. As used herein, the processor resource 104 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 108, 110, 112, 114, 116. In other examples, the computing device 102 can include instructions 108, 110, 112, 114, 116 stored on a machine-readable medium (e.g., memory resource 106, non-transitory computer-readable medium, etc.) and executable by a processor resource 104. In a specific example, the computing device 102 utilizes a non-transitory computer-readable medium storing instructions 108, 110, 112, 114, 116 that, when executed, cause the processor resource 104 to perform corresponding functions.

In some examples, the computing device 102 can include instructions 108 that can be executed by a processor resource 104 to activate a silent mode for the computing device 102 when a videoconference is initiated. As used herein, a silent mode refers to deactivating an output provided by a microphone, such that the sound received at the microphone is not transmitted to other devices or recorded by the computing device 102. In this way, a user associated with the computing device 102 is not transmitting vocal sounds or other sounds within an area of the microphone. In some examples, the silent mode for the computing device 102 can be a default mode when connecting to particular videoconference connections. For example, the computing device 102 can initiate a videoconference connection and select a silent mode for the microphone associated with the computing device 102.

In some examples, a plurality of microphones may be associated with the computing device 102. For example, the computing device 102 can include an on-board microphone that is physically attached or manufactured with the computing device 102 as well as a peripheral device microphone that can be separate from an enclosure of the computing device 102. In these examples, the computing device 102 may utilize a silent mode that restricts received audio from the plurality of microphones from being transmitted to remote computing devices. In this way, each of the plurality of microphones do not have to be altered into a silent mode.

In some examples, the computing device 102 can include instructions 110 that can be executed by a processor resource 104 to set a threshold volume and designated frequency range for the computing device 102. In some examples, the threshold volume for the computing device 102 can be based on a range of speaking volumes associated with a particular user. For example, the computing device 102 can determine a range of volumes for the particular user when the user is instructed to speak. In some examples, the threshold volume can be a minimum threshold volume to allow the user to speak as loudly as they wish so long as it exceeds the minimum threshold volume.

In this way, the computing device 102 can utilize a speaking volume of the particular user to determine when the user is intending to speak into the microphone to be heard by other users associated with the videoconference. Thus, the computing device 102 can identify when the user is speaking at or above the threshold volume and/or when the user is speaking below the threshold volume. In some examples, the computing device 102 can determine that the user intends the audio captured by the microphone at or above the volume threshold to be transmitted to remote computing devices of the videoconference and that the user does not intend the audio captured by the microphone below the volume threshold to be transmitted to the remote computing devices. In this way, the user may be able to ask a question or have a private discussion at a low volume without having to manually alter the mode (e.g., silent mode, non-silent mode, etc.) of the computing device 102.

As used herein, the designated frequency range can be a range of frequencies captured by a user when the user is instructed to speak. For example, the computing device 102 can capture vocal frequencies of a particular user and identify a range of frequencies associated with the user's vocal profile. In this way, the computing device 102 can utilize the vocal range and/or vocal profile to identify when the particular user is speaking compared to when a different user is speaking within the area of the microphone associated with the computing device 102.

In some examples, the combination of the volume threshold and the frequency range can be utilized to determine when a particular user is speaking in a way that is intended to be captured by the microphone and transmitted to the remote computing devices associated with the videoconference. In this way, a user that is not part of the videoconference can make sounds in the background or be talking in the background without interrupting the videoconference and/or without having the user manually alter the mode of the computing device 102. For example, the silent mode of the computing device 102 can be maintained until the particular frequency range and volume threshold are identified. In some examples, the computing device 102 can also filter out frequencies that are not within the frequency range such that when the particular user is speaking at the same time as a different user in the background, at least a portion of the different user can be filtered out of the audio that is transmitted to the remote computing devices.

In some examples, the computing device 102 can include instructions 112 that can be executed by a processor resource 104 to deactivate the silent mode for the computing device when a microphone associated with the computing device 102 receives a sound that exceeds the threshold volume and is within the designated frequency range. As described herein, the computing device 102 can deactivate the silent mode or activate a non-silent mode such that audio captured by the microphone can be transmitted to the remote computing devices. As described herein, the deactivation of the silent mode can be performed upon receiving the combined audio that is above the volume threshold and within the frequency range. In some examples, the frequency range can include an audio profile of a particular user and the silent mode can be deactivated when the particular user is identified by their audio profile.

In some examples, the computing device 102 can include instructions 114 that can be executed by a processor resource 104 to send the received sound to other users of the videoconference. As described herein, the received sound at the microphone can be provided to the plurality of remote computing devices and/or other users associated with the teleconference or videoconference when the sound exceeds the volume threshold and/or is within the frequency range.

In some examples, the computing device 102 can include instructions 116 that can be executed by a processor resource 104 to activate the silent mode for the computing device 102 when the microphone stops receiving the sound. As described herein, the computing device 102 can activate the silent mode for the computing device 102 when the volume of the sound falls below the volume threshold and/or when the frequency of the sound is outside the frequency range. In this way, the computing device 102 can activate or reactivate the silent mode when the particular user stops speaking. This can be helpful to avoid unwanted sound received at the computing device 102 from being picked up by the microphone associated with the computing device 102, which can cause disrupting noise for the teleconference or videoconference.

In some examples, the computing device 102 can include instructions that can be executed by a processor resource 104 to designate the computing device 102 as a host device for the videoconference. As used herein, the host device for a teleconference or videoconference can include a device that is capable of altering functions associated with one or more of the remote computing devices of the teleconference or videoconference. For example, the host device can be capable of muting other computing devices, deactivating applications of the other computing devices, preventing the computing device from leaving a full screen view of the videoconference, among other features to allow the host to ensure that the users associated with the other computing devices are paying attention to the video and/or audio provided by the host.

In some examples, the computing device 102 can include instructions that can be executed by a processor resource 104 to determine designated videoconference applications for a plurality of computing devices associated with the other users. As used herein, a designated videoconference application can be an application of a computing device that is being utilized to view or interact with the videoconference. In some examples, the computing device 102 can determine an installed videoconference application that is installed and/or being utilized by the remote computing devices associated with the videoconference.

In this way, the computing device 102 can determine functions of the designated videoconference applications for the plurality of remote computing devices associated with the videoconference. As described herein, the computing device 102 can be designated as a host device for the videoconference and the computing device 102 can alter functions or settings of the designated videoconference application and/or other functions of the remote computing devices while the remote computing devices are connected to the videoconference.

In some examples, the computing device 102 can include instructions that can be executed by a processor resource 104 to prevent the plurality of computing devices associated with the other users from accessing non-designated videoconference application. As described herein, the designated videoconference application can be an application that is utilized by the computing device 102 and/or the remote computing devices to view or interact with the videoconference. Non-designated videoconference applications can include other applications of the computing device 102 and/or remote computing devices that are not to be utilized for the videoconference. In some examples, the non-designated videoconference applications can be selected by the host device. For example, the computing device 102 can select particular applications that can be utilized during the videoconference by the plurality of remote computing devices associated with the videoconference and/or select specific applications that may not be utilized during the videoconference by the plurality of remote computing devices associated with the videoconference. In this way, the plurality of remote computing devices can be allowed to utilize particular applications and prevented from utilizing other applications. This can increase productivity during the videoconference since applications that can be distracting to the other users can be restricted from use during the videoconference while other applications that may be necessary or essential to the videoconference can remain functional.

In some examples, the computing device 102 can include instructions that can be executed by a processor resource 104 to lock a videoconference application in a full screen mode for a plurality of computing devices associated with the other users of the videoconference. As described herein, the host device for the videoconference can have control over a number of functions associated with the remote computing devices of the videoconference.

One of these functions can be to provide a full screen mode of the videoconference application and restrict the user of the remote computing device from being able to exit the full screen mode without exiting the videoconference. In this way, attendance of a particular videoconference can be better identified since a user may not be able to minimize the videoconference application to perform other functions utilizing the remote computing device during the videoconference. As described further herein, this can be combined with eye tracking associated with the remote computing devices to ensure a different device is not being utilized during the videoconference. Thus, the eye tracking and/or full screen function can ensure that the remote user is viewing the display of the remote computing device and not able to view other applications during the videoconference. In other examples, peripheral monitors or displays of the computing device can be deactivated to prevent a remote user from utilizing a different display of the remote computing device during the videoconference.

In some examples, the computing device 102 can include instructions that can be executed by a processor resource 104 to send an invite to a plurality of computing devices associated with the other users of the videoconference. In these examples, the invite can include a permission to access functions of a corresponding computing device and a time period to access functions of the corresponding computing device. As described herein, the host device can be capable of altering settings and/or performing functions associated with the remote computing devices of a videoconference during the time period of the videoconference. In this example, the invitation to join the videoconference can include a permission function to allow the computing device 102 to access the functions of the remote computing device during the videoconference. In some examples, the permission function can include instructions to send the computing device 102 particular access authority for the time period of the videoconference. In this way, the host device can have temporary access to the plurality of remote computing devices for functions associated with the videoconference during the particular time period that is scheduled for the videoconference.

In some examples, the computing device 102 can include instructions that can be executed by a processor resource 104 to deactivate the silent mode for the computing device 102 when a designated phrase is spoken. In these examples, the designated phrase can include a designated name of one of the other users of the videoconference. In some examples, the computing device 102 can utilize a silent mode that still receives audio from the microphone associated with the computing device 102 without sending the received audio to the remote computing devices associated with the videoconference. In this way, the computing device 102 can determine when a designated phrase or word is spoken by the user associated with the computing device 102. In other examples, the user of the computing device 102 can speak their own name to unmute themselves to allow the user to send audio to the plurality of users associated with the videoconference.

In some examples, the computing device 102 can identify names of the plurality of users associated with the plurality of remote computing devices that are currently participating in the videoconference. In this way, the computing device 102 can include the identified names of the plurality of users as designated phrases for deactivating the silent mode. In some examples, the user of the computing device 102 can say one of the identified names and the computing device 102 can deactivate the silent mode and send the received audio to the plurality of remote computing devices. In this way, the user associated with the computing device 102 can simply say a name of one of the plurality of users of the videoconference to deactivate the silent mode of the computing device 102 instead of manually deselecting or selecting the silent mode to be deactivated. Although a name of a user is utilized as an example, other phrases or words can be utilized.

In some examples, the computing device 102 can include instructions that can be executed by a processor resource 104 to send the sound received to a particular user associated with the name of the one of the other users of the videoconference and refrain from sending the sound to the remaining other users of the videoconference. As described herein, the computing device 102 can identify a plurality of users associated with the videoconference and identify the corresponding names of the plurality of users. In these examples, the names of the corresponding plurality of users can be utilized as phrases to direct particular audio to a specific user of the plurality of users. For example, a user of the computing device 102 can say the name "Matt" followed by additional vocals. In this example, the computing device 102 can identify a remote computing device associated with the named user Matt and send the audio file to the remote computing device associated with the named user Matt and prevent the audio file from being sent to the other remote computing devices that are not associated with the named user Matt.

In some examples, the computing device 102 can receive the names or key words associated with each of the plurality of remote computing devices by a user associated with the computing device 102. For example, the user of the computing device 102 can select a particular user associated with the videoconference and record a corresponding name or key word to be utilized for that particular user. In this way, the computing device 102 can more easily identify the particular user that the user of the computing device 102 intends to direct particular communication to during the videoconference.

In some examples, the computing device 102 can include instructions that can be executed by a processor resource 104 to receive an alert that a computing device associated with one of the other users has determined a corresponding user has been looking away from a videoconferencing application for a particular period of time that exceeds a threshold time period. In some examples, a host device can be responsible for identifying when particular users associated with a videoconference are not paying attention or are distracted. This can be difficult when a user of the host device is also presenting information. Thus, in some examples, the computing device 102 can utilize eye tracking from received video of the plurality of users and/or the corresponding remote computing devices to determine when a particular user is not viewing the display of the corresponding remote computing device. In this way, a notification can be provided to the host device when a particular user is distracted or not paying attention to a particular portion of a presentation or particular discussion of the videoconference.

Figure 2:
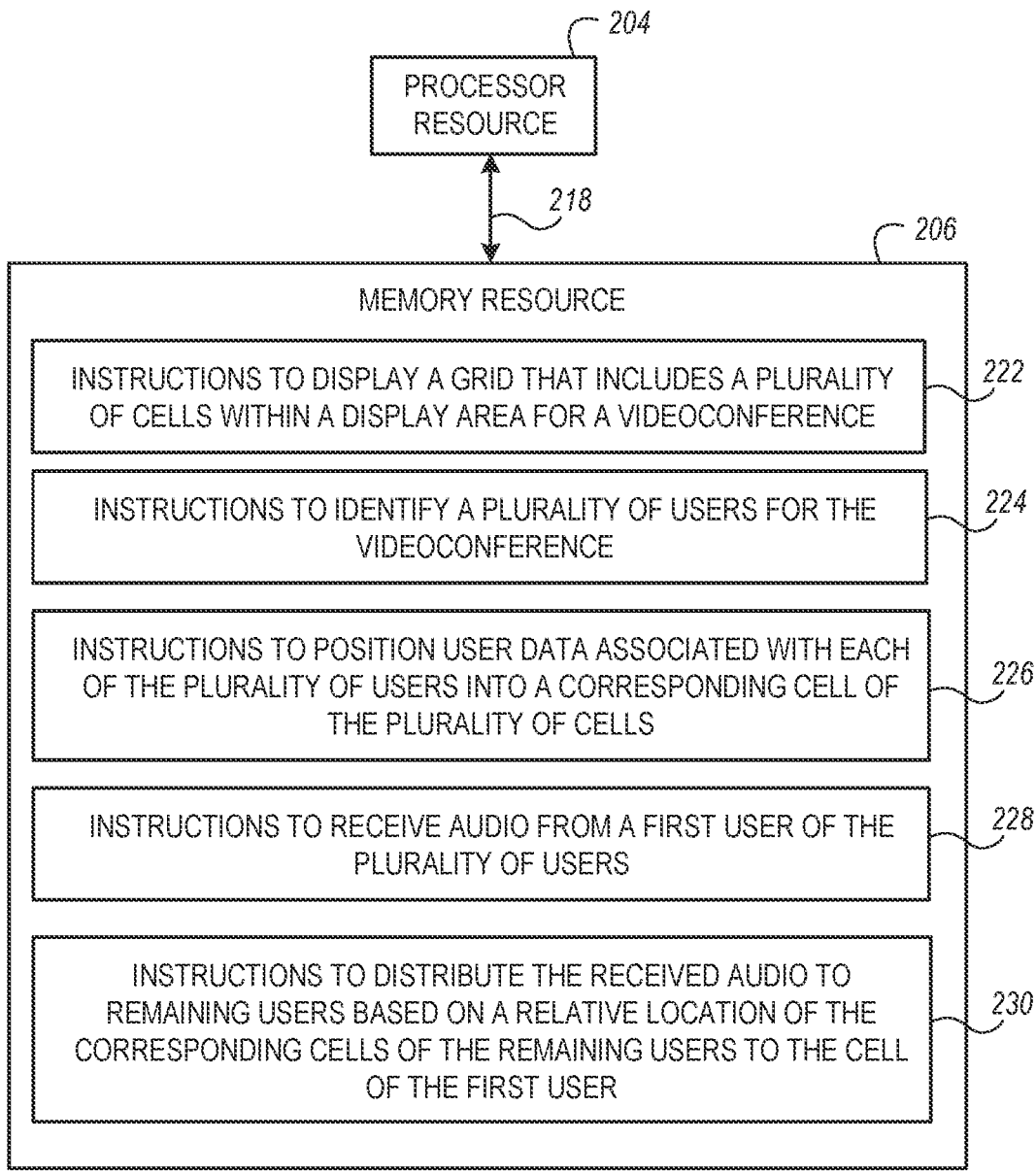
FIG. 2 illustrates an example of a memory resource storing instructions for videoconference communication.

FIG. 2 illustrates an example of a memory resource 206 storing instructions 222, 224, 226, 228, 230 for videoconference communication. In some examples, the memory resource 206 can be a part of a computing device or controller that can be communicatively coupled to a computing system that includes peripheral devices. For example, the memory resource 206 can be part of a computing device 102 as referenced in FIG. 1. In some examples, the memory resource 206 can be communicatively coupled to a processor resource 204 that can execute instructions 222, 224, 226, 228, 230 stored on the memory resource 206. For example, the memory resource 206 can be communicatively coupled to the processor resource 204 through a communication path 216. In some examples, a communication path 216 can include a wired or wireless connection that can allow communication between devices and/or components within a single device.

The memory resource 206 may be electronic, magnetic, optical, or other physical storage device that stores executable instructions. Thus, non-transitory machine readable medium (MRM) (e.g., a memory resource 206) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine readable medium (e.g., a memory resource 206) may be disposed within a controller and/or computing device. In this example, the executable instructions 222, 224, 226, 228, 230 can be "installed" on the device. Additionally, and/or alternatively, the non-transitory machine readable medium (e.g., a memory resource) can be a portable, external or remote storage medium, for example, that allows a computing system to download the instructions 222, 224, 226, 228, 230 from the portable/external/remote storage medium. In this situation, the executable instructions may be part of an "installation package". As described herein, the non-transitory machine readable medium (e.g., a memory resource 206) can be encoded with executable instructions for generating illumination portions on the display to alter a luminosity at a subject.

The instructions 222, when executed by a processor resource such as the processor resource 204, can include instructions to display a grid that includes a plurality of cells within a display area for a videoconference. In some examples, the grid can include a plurality of cells that are occupied by users associated with the videoconference and a plurality of cells that are not occupied by users associated with the videoconference. As described further herein, the plurality of cells that are not occupied by users can be utilized or occupied by new users to the videoconference and/or a particular user can move from a current cell that the user occupies to a non-occupied cell.

The instructions 224, when executed by a processor resource such as the processor resource 204, can include instructions to identify a plurality of users for the videoconference. In some examples, identifying the plurality of users for the videoconference can include identifying user profile information associated with the plurality of users. In this way, the plurality of users can be categorized based on the user profile information. For example, the plurality of users can be categorized based on age, education level, work department, interests, group identification, among other features of the user profile. In some examples, the categorization can be utilized to organize or position the plurality of users into the plurality of cells within the grid for the videoconference.

The instructions 226, when executed by a processor resource such as the processor resource 204, can include instructions to position user data associated with each of the plurality of users into a corresponding cell of the plurality of cells. In some examples, the user data can include, but is not limited to: a portion of the user profile information, video received from a corresponding remote computing device associated with the user, and/or other information related to the user. In this way, the video associated with the particular user can be positioned within a particular cell of the plurality of cells of the grid.

The instructions 228, when executed by a processor resource such as the processor resource 204, can include instructions to receive audio from a first user of the plurality of users. As described herein, the videoconference can allow audio and/or video to be exchanged between a plurality of users associated with the videoconference. In some examples, a first computing device associated with the first user can receive the audio from the first user through a microphone or other type of audio receiving device. In addition, the first computing device associated with the first user can receive video from the first user through a camera other type of image capturing device.

The instructions 230, when executed by a processor resource such as the processor resource 204, can include instructions to distribute the received audio to the remaining plurality of users based on a relative location of the corresponding cells of the remaining plurality of users to the cell of the first user. In some examples, the audio from the first user can be distributed to the other users associated with the videoconference based on the proximity of the other users to the cell of the first user when the computing device of the first user received the audio from the first user. For example, a second user that is one cell over or in a proximate cell to the first user can be provided with the audio at a first volume level and a third user that is two cells over or a plurality of cells away from the cell of the first user can be provided with the audio at a second volume level. In this example, the first volume level can be relatively louder than the second volume level. In this way, the experience of the plurality of users can be more similar to a group of users in a physical room, where the volume of a particular user dissipates to other users and the volume and/or direction of the audio is based on a relative location of the particular user to a speaker.

In a similar way to the distance between the cell of a first user that generates the audio and a cell of a second user that receives the audio can be different volumes, the relative direction between cells can be utilized to alter the sound that is provided to a receiving user. For example, the grid can include a front, back, right, and left side that are designated for all of the users and/or designated for each of the users based on a user's perspective within the grid. In this way, a right and left direction can be identified between a first user and a second user within corresponding cells of the grid. In this way, a first user can generate audio that is received by a corresponding computing device and the audio can be provided to a left speaker of a second user that is located in a cell to the right of the first user and provided to a right speaker of a third user that is located in a cell to the left of the first user.

In some examples, the memory resource 206 can include instructions that when executed by processor resource 204 can cause the processor resource 204 to increase an intensity or volume of the audio from the first user for a first portion of users and decrease the intensity or volume of the audio from the first user for a second portion of users. In these examples, the first portion of users are closer to the cell of the first user within the grid than the second portion of users. As described herein, the intensity and/or direction of the audio from the first user can be distributed to the other users based on the distance and direction between the cells within the grid. In this way, an intensity (e.g., volume level, etc.) of audio to be provided to the first portion of users can be altered to be louder than the audio to be provided to the second portion of users. In this way, the volume level for a particular user that receives audio from the first user is based on a relative distance between the cell of the particular user and the cell of the first user.

In some examples, the memory resource 206 can include instructions that when executed by processor resource 204 can cause the processor resource 204 to move the first user from the cell within the grid to a different cell within the grid and alter a distribution of received audio from the first user based on a relative location to the different cell. As described herein, the first user can be designated to a first cell and occupy the first cell. In this way, the first user can have audio provided to the other users of the videoconference based on a distance and direction relative to the first cell. However, the first user can alter a location within the grid to a second cell that is different than the first cell. When the first user generates audio to be provided to the other users when occupying the second cell, the audio provided to the other users can be based on the relative distance and direction from the second cell.

In some examples, the memory resource 206 can include instructions that when executed by processor resource 204 can cause the processor resource 204 to distribute the received audio with an altered intensity based on a distance between the cell of the first user and the corresponding cells of the remaining plurality of users. As described herein, a current location (e.g., cell location) of a particular user can be identified from the grid and the audio generated by the particular user can be distributed to the other users based on a distance and direction between the particular user and the other users within the grid.

In some examples, the memory resource 206 can include instructions that when executed by processor resource 204 can cause the processor resource 204 to designate a second user as a host for the videoconference and allow the host to alter a cell location of the user data of the plurality of users. As described herein, the videoconference can include a designated host that can control functions associated with the remote computing devices during the videoconference. In these examples, the host can alter a cell location of the plurality of users. In this way, the host device can create particular groups at designated locations within the grid to allow for different group work to be performed while also allowing some privacy between the groups. In some examples, the host can utilize audio blocks that can be positioned within the grid to block audio between one or more of the groups. In this way, the host can create individual groups of users by designating the users within a boundary of audio blocks. The audio blocks can be positioned at the borders of cells to prevent audio data from being transmitted even to a user within a proximate cell when the audio block is positioned between the proximate cells.

In some examples, the memory resource 206 can include instructions that when executed by processor resource 204 can cause the processor resource 204 to position the user data into cells based on a determined discussion between a third user and a fourth user. In these examples, the position is based on an eye direction of the third user and the fourth user. In some examples, eye tracking technology can be utilized to determine a cell location for a plurality of users. For example, a plurality of users can be positioned within the grid as described herein. In this example, a third user can be having a discussion with a second user. In this example, the fourth user can be looking at the third user that is displayed at the particular cell. In this example, the location of the fourth user can be altered to a position closer to the third user such that the fourth user can more clearly hear or participate in the conversation between the third user and the second user.

In some examples, the memory resource 206 can include instructions that when executed by processor resource 204 can cause the processor resource 204 to position the user data into cells in response to the first user speaking a designated phrase associated with the second user. In these examples, the position of the first user is altered to a cell proximate to a cell of the second user. As described herein, a designated phrase, designated word, and/or key phrase can be utilized to indicate that a particular audio message be provided to a particular user. In a similar way, the designated phrase can be utilized to indicate that the cell location of a particular user be changed to be proximate to a user that corresponds to the designated phrase. In some examples, the position of the first user and/or cell position of the first user and the second user can remain constant when the first user speaks the designated phrase for the second user. In these examples, the sound distributed to the second user can be distributed as if the first user was proximate to the second user within the grid such that the audio of the first user is directed to the second user when the designated phrase for the second user is utilized by the first user.

In some examples, the designated phrase can generate a notification. In these examples, a first user can say the designated phrase "Scott" and a notification can be sent to a computing device associated with a second user with the name Scott or identified as Scott. In these examples, the computing device can receive the notification and provide a selection to alter a current location of the second user to a proximate location of the first user. When the second user accepts, the first user and/or the second user can be moved from their corresponding locations of the grid to a proximate cell location such that the first user is in a first cell that is proximate to the second user in a second cell.

In some examples, the grid can include separate portions that are separated by audio blocks. These separate portions can be identified as rooms similar to an office space that is separated from a conference area. In some examples, a request can be sent from a first user to a second user to enter a separate portion for a discussion between the first user and the second user or a portion of the plurality of users as described herein. In this way, a separate conversation between a portion of the plurality of users can be performed during the videoconference that includes the plurality of users.

Figure 3:
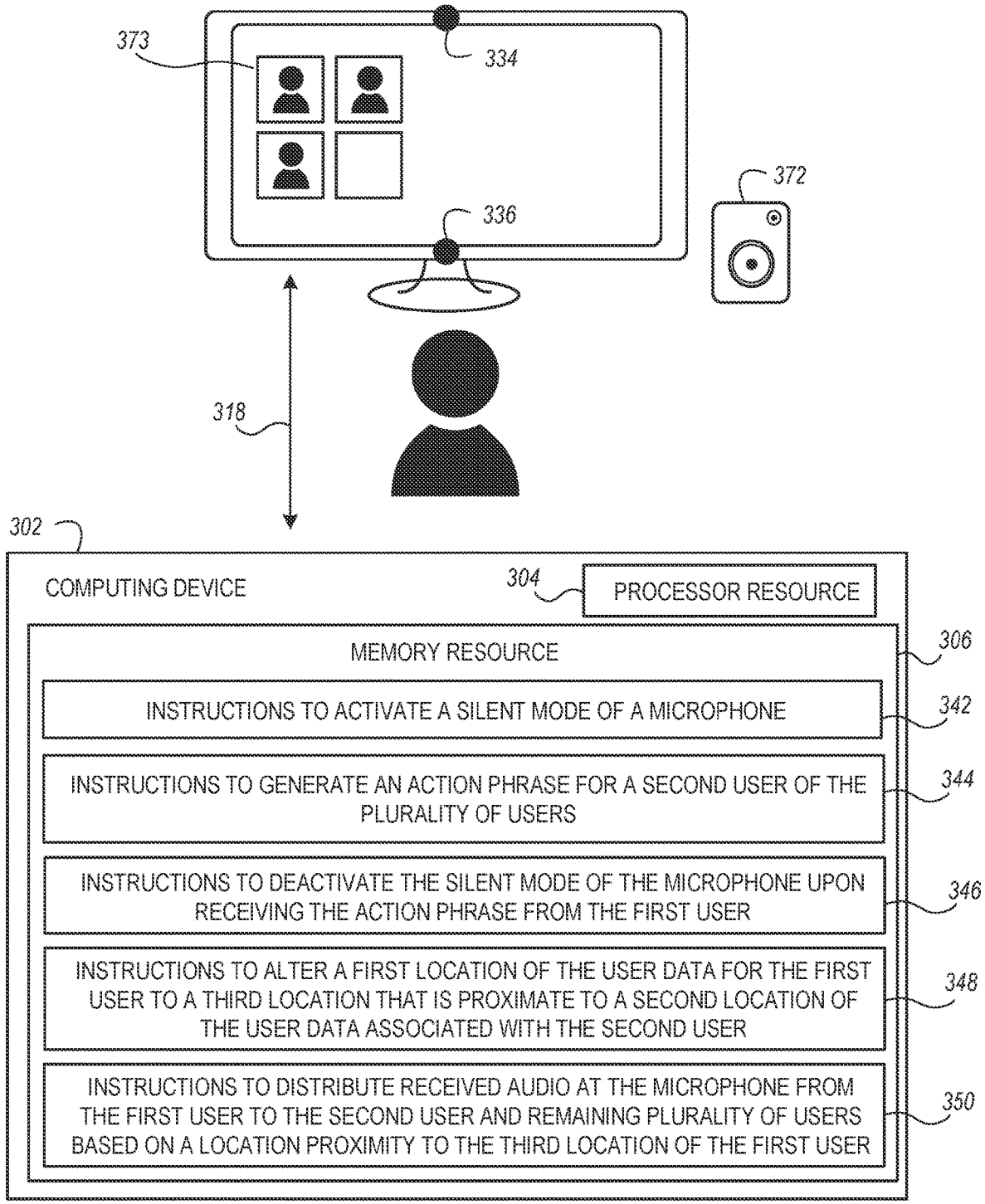
FIG. 3 illustrates an example of a system including a computing device for videoconference communication.

FIG. 3 illustrates an example of a system 300 including a computing device 302 for videoconference communication. In some examples the computing device 302 can be a device that includes a processor resource 304 communicatively coupled to a memory resource 306. As described herein, the memory resource 306 can include or store instructions 342, 344, 346, 348, 350 that can be executed by the processor resource 304 to perform particular functions. In some examples, the computing device 302 can be communicatively coupled to a plurality of peripheral devices. For example, the computing device 302 can be communicatively coupled to a display 332, camera 334, microphone 336, and/or a speaker 372 through a communication path 318. In this way, the computing device 302 can be utilized to provide a videoconference between a user 338 and a remote user through a remote computing device.

In some examples, the computing device 302 can include instructions 342 that can be executed by a processor resource 304 to activate a silent mode of the microphone 336. As described herein, the silent mode of the microphone 336 can deactivate the microphone 336 and/or prevent audio data that is captured by the microphone 336 from being transmitted to remote computing devices.

In some examples, the computing device 302 can include instructions 344 that can be executed by a processor resource 304 to generate an action phrase for a second user of the plurality of users. As used herein, the action phrase can include a designated phrase, designated word, key word, or the like that is used to initiate an action. In some examples, the computing device 302 can record and/or store an audio file of the action phrase that is generated by the first user (e.g., user 338, etc.) to be associated with the second user. In some examples, the action phrase can be the name or nickname of the second user. In this way, the user 338 of the computing device 302 can generate action phrases for each of the plurality of users associated with a videoconference. In some examples, the action phrases for the plurality of users can be stored with a user profile associated with each of the plurality of users. In this way, the user 338 can utilize the same action phrase for the plurality of users during a subsequent videoconference with the plurality of users.

In some examples, the computing device 302 can include instructions 346 that can be executed by a processor resource 304 to deactivate the silent mode of the microphone 336 upon receiving the action phrase from the first user (e.g., user 338). As described herein, the action phrase can indicate that the user 338 is directing communication to the second user based on the action phrase. For example, the action phrase can be the name of the second user and/or specific to the second user. In other examples, the action phrase can be applied to a plurality of users including the second user. In some examples, the first user can be the user 338 of the computing device 302. In these examples, the user 338 can say the action phrase that is received by the microphone 336. The computing device 302 can recognize the action phrase received by the microphone 336 and deactivate the silent mode of the microphone 336.

In some examples, the computing device 302 can include instructions 348 that can be executed by a processor resource 304 to alter the first location of the user data for the first user to a third location that is proximate to a second location of the user data associated with the second user. In some examples, the location proximity is a displayed distance between user data presented at locations (e.g., cell locations, etc.) within the area. As described herein, the first user can be positioned at a first cell location of a grid. In some examples, the cell location within the grid can be altered to a different cell location based on a selection of the user 338. In other examples, the cell location within the grid can be altered in response to the action phrase. In these examples, the action phrase can indicate that a specific user is intended to receive the audio data and/or initiate a specific conversation between the first user and the second user. In this way, the action phrase can act to deactivate the silent mode of the microphone 336 and alter the location of the first and/or second user such that the first and second user are positioned within proximate or substantially proximate cells within the grid.

In some examples, the computing device 302 can include instructions 350 that can be executed by a processor resource 304 to distribute received audio at the microphone 336 from the first user to the second user and remaining plurality of users based on a location proximity to the third location of the first user. As described herein, when the first user is moved from the first cell location to the third cell location, the audio data associated with the first user can be distributed based on a currently occupied cell location. Thus, when the first user is located within the first cell location the audio data can be distributed based on the proximity between the first cell location and the corresponding cell locations of the plurality of users. In addition, the audio data can be distributed based on the third cell location when the first user occupies the third cell location. Thus, the computing device 302 can include instructions that can be executed by a processor resource 304 to alter an intensity provided to the second user and the remaining plurality of users based on the location proximity of the presented user data at the third location.

In some examples, the computing device 302 can include instructions that can be executed by a processor resource 304 to alter a direction of sound provided to the second user and the remaining plurality of users based on the location proximity of the presented user data at the third location. As described herein, the direction can be designated for each of the plurality of users for the grid. In this way, a direction from a user that is generating the audio data and a user receiving the audio data can be determined and utilized to alter the audio that this provided to the user receiving the audio data. For example, audio data received from a user positioned on a left side of the receiving user can be provided primarily or in a relatively higher quantity to a speaker positioned on a left side of the receiving user.

In some examples, the computing device 302 can include instructions that can be executed by a processor resource 304 to send a request to the second user to designate the first user as a host and enable the processor resource 304 to alter functions of a computing device associated with the second user. As described herein, a host for the videoconference can control functions of computing devices associated with other users of the videoconference. In some examples, permission and/or access can be provided to the host device through a request that is provided to the remote computing devices prior to initiating the videoconference.

In some examples, the computing device 302 can include instructions that can be executed by a processor resource 304 to send eye tracking information to the second user when the user data of the first user at the third location is proximate to the user data of the second user at the second location. As described herein, eye tracking can be utilized to identify when the second user is intending communication to be directed to a first user. In a similar way, the eye tracking can be utilized to position the first user at a particular location within the grid based on the eye location of the second user. For example, the first user can be displayed at a location on the display of the second user to allow the second user to seem as though they are looking toward the first user instead of in a different direction, which can happen when the location of the displayed first user is in a different location.

In some examples, the computing device 302 can include instructions that can be executed by a processor resource 304 to determine a relative angle between the camera 334, the display 332, the first user 338 proximate to the display 332, and a location of a videoconference application 373 displayed on the display 332 to distribute received audio from the first user 338 to the second user. In some examples, a calibration routine may be performed for the system 300 for correct sound intensity modulation and user placement associated with the grid of the videoconference application 373. In one example, the relative positions (e.g., angles, rotations, etc.) of the first user's 338 camera 334, screen (e.g., display 332), and position on the screen of the videoconference (e.g., videoconference application 373, etc.) can be determined. Here, the first user 338 can be told to look at the camera 334 while the camera 334 is taking video to determine the relative position between the camera 334 and the first user 338 using eye tracking (e.g., eye tracking software, etc.). While still taking video, the first user 338 can be told to look at an image on the screen or display 332 to determine the relative position between the screen or display 332 center and the first user 338. While still taking video, the first user 338 can be told to look at an image on the side of the screen or display 332 to determine the relative position between the display's 332 side and the first user 338.

Figure 4:
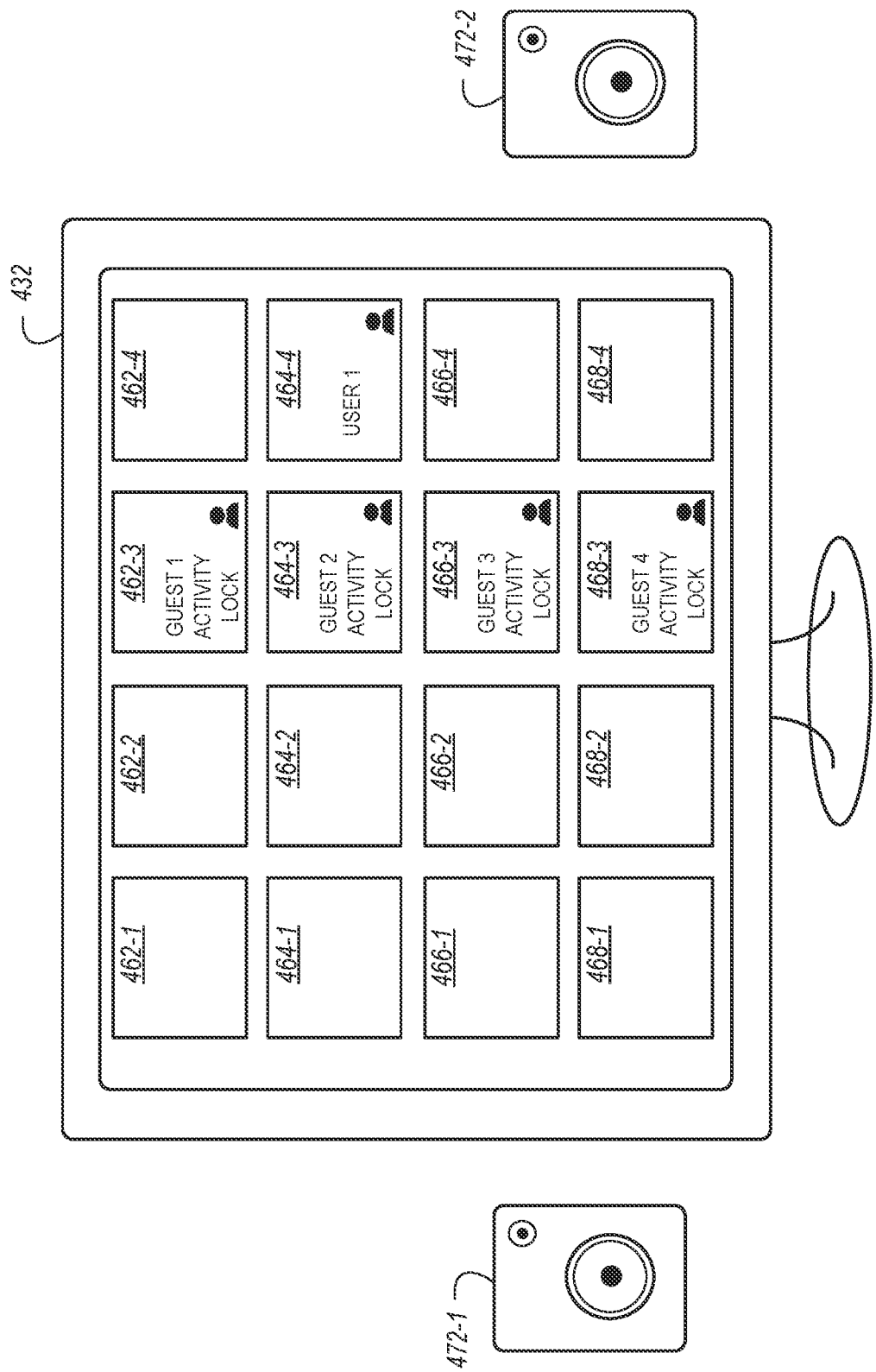
FIG. 4 illustrates an example of a display for videoconference communication.

FIG. 4 illustrates an example of a display 432 for videoconference communication. In some examples, the display 432 can include a plurality of light sources that are able to generate images. For example, the display 432 can be a liquid crystal display (LCD) or similar device for displaying images and/or video. In some examples, the display 432 can illustrate a grid for performing a teleconference and/or videoconference as described herein. In some examples, the grid can include a plurality of rows and a plurality of columns.

For example, the plurality of rows can include a first group of cells 462-1, 462-2, 462-3, 462-4, a second group of cells 464-1, 464-2, 464-3, 464-4, a third group of cells 466-1, 466-2, 466-3, 466-4, and/or a fourth group of cells 468-1, 468-2, 468-3, 468-4. Although four rows are illustrated in FIG. 4 and further examples herein, the grid can include fewer or more rows. In another example, the plurality of columns can include a first group of cells 462-1, 464-1, 466-1, 468-1, a second group of cells 462-2, 464-2, 466-2, 468-2, a third group of cells 462-3, 464-3, 466-3, 468-3, and/or a fourth group of cells 462-4, 464-4, 466-4, 468-4. Although four columns are illustrated in FIG. 4, the grid can include fewer or more columns. In some examples, FIG. 4 can illustrate a grid for a meeting between a user (e.g., User 1) and a plurality of remote users (e.g., Guest 1, Guest 2, Guest 3, Guest 4, etc.).

As described herein, the grid can include a portion of cells that are occupied by users and a portion of cells that are not occupied by users (e.g., unoccupied). For example, the grid can include a user that is located in cell 464-4. In this example, the user can be the user of a particular computing device and/or a host for the videoconference. In some examples, the grid can include a plurality of additional users (e.g., guest users, remote users, etc.). For example, the plurality of additional users can include Guest 1 located in cell 462-3, Guest 2 located in cell 464-3, Guest 3 located in cell 466-3, and/or Guest 4 located in cell 468-3.

In some examples, the occupied cells can include user data associated with a corresponding user that is currently occupying the cell. For example, cell 462-3 can include user information associated with Guest 1. In this example, the user information can include a video or image associated with the remote device being utilized by Guest 1. In some examples, the occupied cells can include activity data associated with the corresponding user currently occupying the cell. As used herein, activity data can include data associated with the activity of the user during the videoconference. For example, the activity data can be information associated with eye tracking data that can be utilized to determine when a particular user is not paying attention or looking away from their display.

In some examples, the activity of the user can include activity of peripheral devices. For example, the activity information can include activity status of a mouse, keyboard, stylus, and/or other type of peripheral device that can be utilized with the remote computing device by the remote user. In this way, the activity of the plurality of users can be monitored. For example, Guest 2 can be directed to utilize a stylus to answer questions within a presented document. In this example, the activity status can indicate when Guest 2 is utilizing the stylus and whether Guest 2 has stopped using the stylus. This can indicate to the user of the display 432 (e.g., User 1, etc.) that Guest 2 is either not performing the task or may need assistance in performing the task.

In some examples, the occupied cells can include a lock function for users currently occupying a particular cell. For example, Guest 3 can be occupying cell 466-3. In this example, cell 466-3 can include a lock function to allow a user of the display 432 to lock or prevent the computing device associated with Guest 3 from performing particular functions. For example, the lock function can lock the computing device associated with Guest 3 in a full screen mode of what is being presented during the videoconference. As described herein, other functions of the remote computing devices associated with particular users can be altered or prevented from being utilized during the videoconference and these functions can be positioned within corresponding cells associated with the remote users.

As described herein, the relative location between users within the grid can be utilized to alter audio that is provided to other users. For example, the User 1 that is occupying cell 464-4 can receive audio with different attributes based on the guest that generated the audio. For example, the audio generated by Guest 2 at cell 464-3 can be provided to both of the speakers 472-1, 472-2 to provide the directional relationship between the User 1 and Guest 2. As described herein, the direction can be the same for all users. In this example, a forward direction for Guest 1, Guest 2, Guest 3, and Guest 4 can be toward the column that includes cells 462-4, 464-4, 466-4, 468-4. In this way, the direction can be limited to providing audio through one of a right speaker (e.g., speaker 472-2) and a left speaker (e.g., speaker 472-1) of the User 1, or some linear combination of the two speakers as defined by the user layout.

In some examples, a distance between the User 1 cell 464-4 and the Guest 1 cell 462-3 can be used to determine an intensity or volume of audio data generated by Guest 1 and received by User 1. In a similar way, a distance between the cell 464-1 of User 1 and the cells of Guest 2, Guest 3, and/or Guest 4 can be determined and utilized for corresponding audio data generated. In some examples, the intensity and direction can be altered for audio data generated by the plurality of remote users. For example, audio data generated by Guest 4 at cell 468-3 can be based on the distance (e.g., quantity of cells) between the cell 468-3 and the cell 464-4 of User 1. In this example, the intensity or volume of audio data generated by Guest 4 can be relatively lower than the intensity or volume of audio data generated by Guest 3 and/or Guest 1. In a similar way, the audio data generated by Guest 3 and/or Guest 1 can be relatively lower than the audio data generated by Guest 2.

In addition, the audio data generated by Guest 4 at cell 468-3 can be provided to the left speaker 472-1 since cell 468-3 is positioned to the left of cell 464-4 from the perspective of the User 1. In this way, the direction for the Guests (e.g., Guest 1, Guest 2, Guest 3, Guest 4, etc.) can be to the right and the direction for the User 1 can be to the left as illustrated in FIG. 4 to make it seem as though a conversation is occurring between this group of users from the perspective of the User 1. In a similar way, the audio data generated by Guest 1 at cell 462-3 can be provided to the right speaker 472-2 since cell 462-3 is positioned to the right of cell 464-4 from the perspective of the User 1.

Figure 5A:
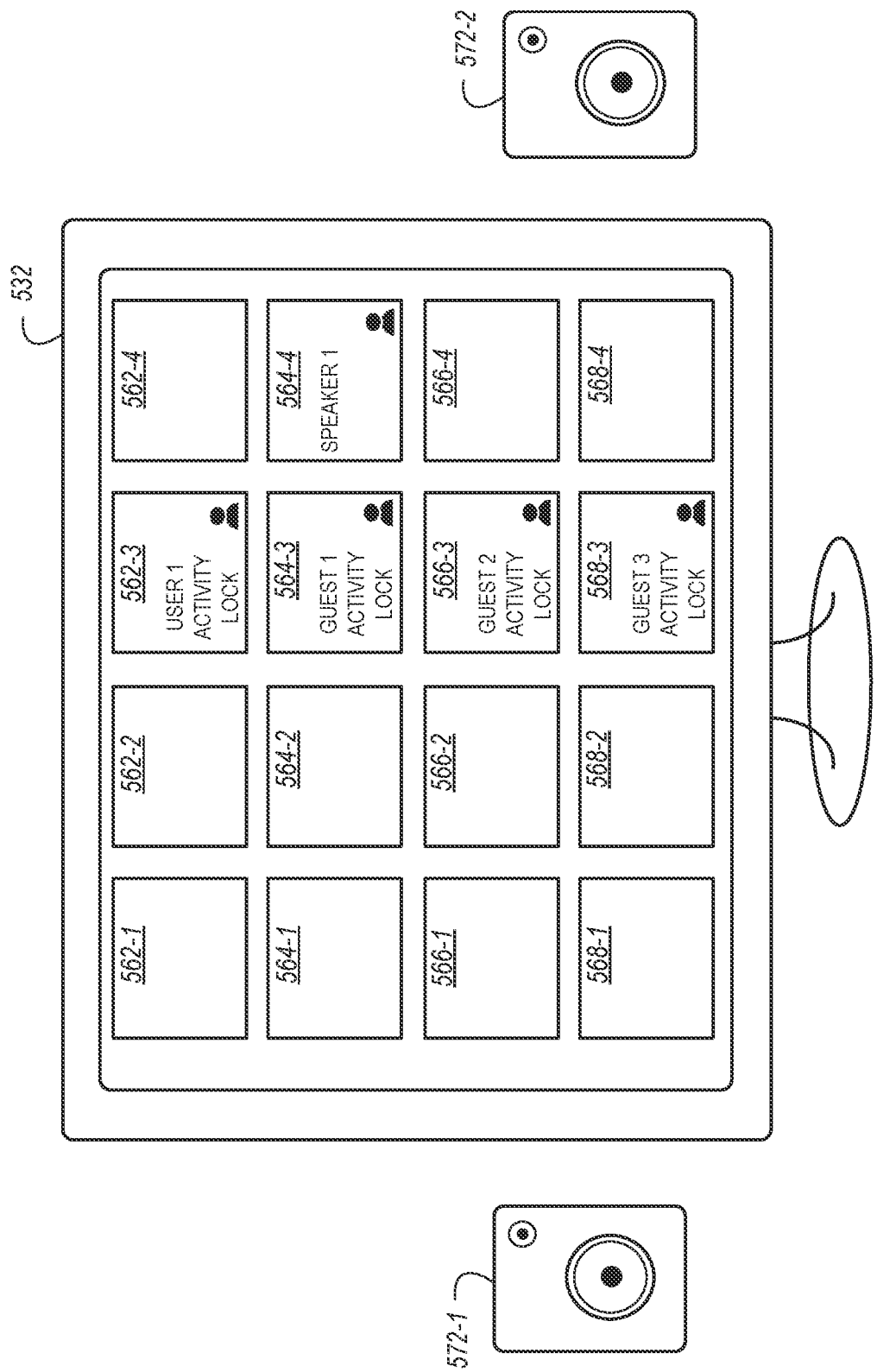
FIG. 5A illustrates an example of a display for videoconference communication.

FIG. 5A illustrates an example of a display for videoconference communication. In some examples, FIGS. 5A and 5B can illustrate the same device at different times. For example, FIG. 5A can illustrate a display 532 at a first time when a plurality of users are positioned within a grid displayed on the display 532. In this example, FIG. 5B can illustrate the display 532 at a second time after a portion of the users positioned within the grid have changed cell locations.

Figure 5B:
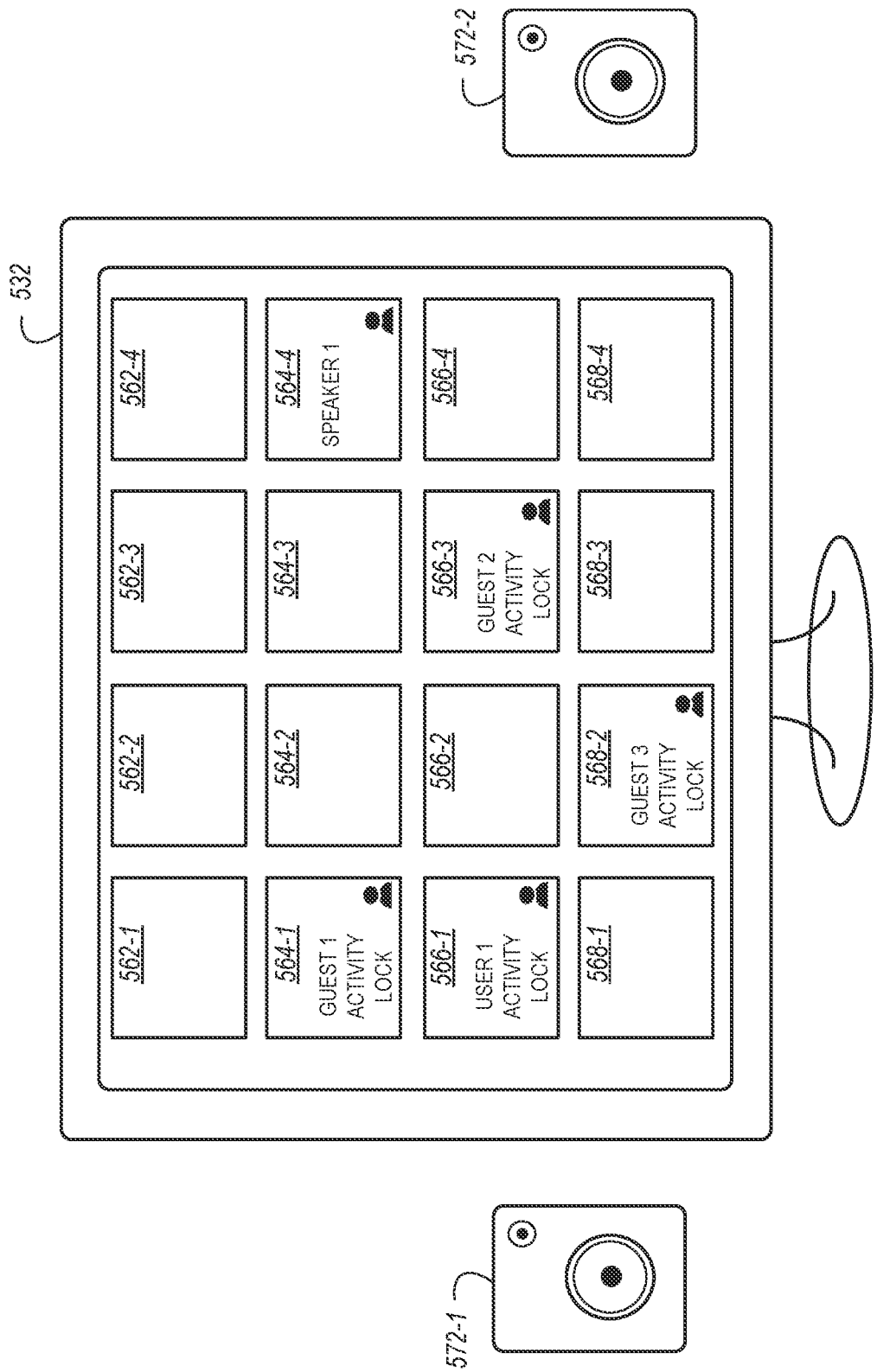
FIG. 5B illustrates an example of a display for videoconference communication.

The display 532 can be the same or similar display as display 432 as illustrated in FIG. 4. For example, the display 532 can display a grid for a particular videoconference. In some examples, the videoconference can be a presentation where a presenter or host (e.g., Speaker 1) is providing information to a plurality of users (e.g., User 1, Guest 1, Guest 2, Guest 3, etc.). In some examples, the grid can include a plurality of rows and a plurality of columns. For example, the plurality of rows can include a first group of cells 562-1, 562-2, 562-3, 562-4, a second group of cells 564-1, 564-2, 564-3, 564-4, a third group of cells 566-1, 566-2, 566-3, 566-4, and/or a fourth group of cells 568-1, 568-2, 568-3, 568-4. Although four rows are illustrated in FIG. 5 and further examples herein, the grid can include fewer or more rows. In another example, the plurality of columns can include a first group of cells 562-1, 564-1, 566-1, 568-1, a second group of cells 562-2, 564-2, 566-2, 568-2, a third group of cells 562-3, 564-3, 566-3, 568-3, and/or a fourth group of cells 562-4, 564-4, 566-4, 568-4. Although four columns are illustrated in FIGS. 5A and 5B, the grid can include fewer or more columns. In some examples, FIGS. 5A and 5B can illustrate a grid for the User 1 and/or user of the display 532.

In some examples, User 1 can occupy 562-3 within FIG. 5A. As described herein, the audio generated by the Speaker 1, Guest 1, Guest 2, and/or Guest 3 can be altered based on a distance between the cell 562-3 and a corresponding cell of the Speaker 1, Guest 1, Guest 2, and/or Guest 3. For examples, the speakers 572-1, 572-2 can each generate a quantity of audio based on the distance and/or direction between the cell 562-3 and a cell of a user that generated the audio data. For example, the audio generated by Guest 1 in cell 564-3 can be provided to speakers 572-1, 572-2 at a greater intensity than audio generated by Guest 3 in cell 568-3 since the distance between cell 562-3 and 564-3 is shorter than the distance between 562-2 and 568-3.

In some examples, the intensity or volume of the Speaker 1 can be provided based on a proximity to a column. For example, the Speaker 1 in cell 564-4 can generate audio data that can be provided at the same or similar intensity to all cells in a proximate column and/or based on a proximity or distance from the column. For example, the User 1 in cell 562-3, Guest 1 in cell 564-3, Guest 2 in cell 566-3, and/or Guest 4 in 568-3 can receive the audio data generated by the Speaker 1 in cell 564-4 at the same intensity they are all proximate to the column that includes cell 564-4.

FIG. 5B illustrates an example of a display 532 for videoconference communication. As described herein, FIG. 5B can illustrate when a portion of the users associated with the videoconference have moved from a first cell location as illustrated in FIG. 5A to a second cell location as illustrated in FIG. 5A. FIG. 5B illustrates that User 1 has moved from cell 562-3 to cell 566-1, Guest 1 has moved from cell 564-3 to cell 564-1, and Guest 3 has moved from cell 568-3 to cell 568-2. In some examples, the User 1 and Guest 1 can move to the corresponding cells illustrated in FIG. 5B to have a conversation during the presentation provided by the Speaker 1. In this example, the User 1 and Guest 1 can still listen to the Speaker 1 with a relatively lower intensity since the distance between the Speaker 1 cell and the corresponding User 1 and Guest 1 cells are greater than illustrated in FIG. 5A.

In addition, Guest 3 can move a column closer to User 1 and Guest 1 such that Guest 3 can hear both the conversation between User 1 and Guest 1 while receiving a relatively louder audio data compared User 1 and Guest 1. As described herein, the plurality of users within the grid can move to different cell locations to receive different levels of intensity of different users during the videoconference. As described herein, audio blocks can be positioned along boundaries of the cells to prevent audio data from being transmitted to proximate cells. In this way, groups can be established such that a meeting within the videoconference can be performed without distracting other users of the videoconference. For example, audio blocks can be positioned around cell 564-1 and cell 566-1 to ensure the conversation between User 1 and Guest 1 does not disturb the other users associated with the videoconference. For example, the audio block around the cell 564-1 and cell 566-1 can prevent audio data from being transmitted to Guest 2 and/or Guest 3 when Guest 2 and/or Guest 3 are outside the audio block perimeter.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. A computing device, comprising:
a processor resource; and
a non-transitory memory resource storing machine-readable instructions stored thereon that, when executed, cause the processor resource to:
activate a silent mode for the computing device when a videoconference is initiated;
set a threshold volume and designated frequency range for the computing device;
deactivate the silent mode for the computing device when a microphone associated with the computing device receives a sound that exceeds the threshold volume and is within the designated frequency range;
send the received sound to a particular user associated with a name of one of other users of the videoconference and refrain from sending the sound to remaining users of the videoconference;
activate the silent mode for the computing device when the computing device stops receiving the sound;
activate control over a plurality of the computing devices associated with the other users of the videoconference; and
utilize the control to restrict the plurality of computing devices from exiting a full-screen mode of an application window of the videoconference without exiting the videoconference.

2. The computing device of claim 1, wherein the processor resource is to:
designate the computing device as a host device for the videoconference;
determine designated videoconference applications for the plurality of computing devices associated with the other users; and
prevent the plurality of computing devices associated with the other users from accessing non-designated videoconference application.

3. The computing device of claim 1, wherein the processor resource is to send an invite to a plurality of computing devices associated with the other users of the videoconference, wherein the invite includes a permission to access functions of a corresponding computing device and a time period to access the functions of the corresponding computing device.

4. The computing device of claim 1, wherein the processor resource is to deactivate the silent mode for the computing device when a designated phrase is spoken, wherein the designated phrase includes a designated name of one of the other users of the videoconference.

5. The computing device of claim 1, wherein the processor resource is to receive an alert that a computing device associated with one of the other users has determined a corresponding user has been looking away from a videoconferencing application for a particular period of time that exceeds a threshold time period.

6. A system, comprising:
a camera to capture images associated with a first user;
a microphone to capture audio associated with the first user;
a display to present user data of the first user at a first location and user data associated with a plurality of users at corresponding locations during a videoconference; and
a non-transitory computer readable medium, storing instructions that, when executed, cause a processor to:
activate a silent mode for the microphone when the videoconference is initiated;
set a threshold volume and designated frequency range for the microphone;
deactivate the silent mode for the microphone when the microphone receives a sound that exceeds the threshold volume and is within the designated frequency range or when a designated phrase is spoken, wherein the designated phrase includes a designated name of one of the plurality of users of the videoconference;
send the sound received to a particular user associated with the designated name of the one of the plurality of users of the videoconference and refrain from sending the sound to remaining users of the plurality of users of the videoconference;
activate the silent mode for the microphone when the microphone stops receiving the sound;
activate control over a plurality of computing devices associated with other users of the videoconference; and utilize the control to restrict the plurality of computing devices from exiting a full-screen mode of an application window of the videoconference without exiting the videoconference.

7. The system of claim 6, wherein the processor is to send an invite to a plurality of computing devices associated with the plurality of users of the videoconference, wherein the invite includes a permission to access functions of a corresponding computing device and a time period to access functions of the corresponding computing device.

8. The system of claim 6, wherein the processor is to receive an alert that a computing device associated with one of the plurality of users has determined a corresponding user has been looking away from a videoconferencing application for a particular period of time that exceeds a threshold time period.

9. The system of claim 6, wherein the processor is to designate a computing device of the first user as a host device for the videoconference.

10. The system of claim 9, wherein the processor is to provide access to functions of corresponding computing devices of the plurality of users to the host device.

11. A non-transitory computer readable medium, storing instructions that, when executed, cause a processor resource to:
   activate a silent mode for a host computing device when a videoconference is initiated with other users;
   set a threshold volume and designated frequency range for the host computing device;
   deactivate the silent mode for the host computing device when a microphone associated with the host computing device receives a sound that: exceeds the threshold volume, is within the designated frequency range, and includes a designated phrase that includes a designated name of one of the other users of the videoconference; and
   send received sound to a particular user associated with the designated name of one of the other users of the videoconference and refrain from sending the sound to remaining users of the videoconference;
   activate the silent mode for the microphone when the microphone stops receiving the sound;
   activate control over a plurality of the computing devices associated with the other users of the videoconference; and
   utilize the control to restrict the plurality of computing devices from exiting a full-screen mode of an application window of the videoconference without exiting the videoconference.

12. The non-transitory computer readable medium, of claim 11, wherein the processor resource is to:
   determine designated videoconference applications for a plurality of computing devices associated with the other users; and
   prevent the plurality of computing devices associated with the other users from accessing non-designated videoconference applications.

13. The non-transitory computer readable medium, of claim 11, wherein the processor resource is to send an invite to a plurality of computing devices associated with the other users of the videoconference, wherein the invite includes a permission to access functions of a corresponding computing device and a time period to access functions of the corresponding computing device.

14. The non-transitory computer readable medium, of claim 11, wherein the processor resource is to receive an alert that a computing device associated with one of the other users has determined a corresponding user has been looking away from a videoconferencing application for a particular period of time that exceeds a threshold time period.

* * * * *